July 10, 1928.

W. S. DOLL 1,676,325

MANDREL

Filed Aug. 16, 1922

Patented July 10, 1928.

1,676,325

UNITED STATES PATENT OFFICE.

WILLIAM S. DOLL, OF AKRON, OHIO.

MANDREL.

Application filed August 16, 1922. Serial No. 582,170.

This invention relates to mandrels for the manufacture of tubular articles such as rubber hose and has particular relation to new and useful improvements in expansible mandrels; the device of this invention being especially adapted for use in the manufacture of air brake hose or similar articles which are required to stand great pressure.

Objects of the invention are to provide a mechanically expansible mandrel of simple, economical construction which will be composed of few parts and which in use will provide a form upon which an air brake hose or other tubular article may be built up and expanded or compacted against the walls of a mold during vulcanization.

A further object is to provide, in combination with a mold, an expansible mold core or mandrel which is composed of separable sections arranged to provide an efficient, easily operable device and which when operated will exert a great expansive force and to provide means whereby a hose or similar article may be expanded before being placed in the mold and which may be further expanded and compacted against the walls of the mold during vulcanization.

An additional object is to provide a mandrel upon which a hose may be built up and expanded during vulcanization and which may be quickly contracted and conveniently removed from the hose when the manufacturing process is completed.

The above objects are accomplished and additional ends are attained by the novel construction, combination and arrangement of parts hereinafter described and illustrated in the accompanying drawings wherein I have shown a preferred embodiment of the invention, it being understood that the invention is capable of various adaptations and that changes and modifications may be made or substitutions resorted to which come within the scope of the claims hereunto appended.

In the drawings in which similar numerals of reference are used to designate like parts throughout the several views and in which:—

Figure 1 is a central, longitudinal, sectional view of a device constructed in accordance with this invention showing the same with an air brake hose positioned therein and taken as indicated by the line 1—1 of Figure 2.

Figure 2 is a cross sectional view of same taken as indicated by the line 2—2 of Figure 1.

Figure 3 is a cross sectional view of my improved mandrel showing the same in an expanded condition and taken as indicated by the line 2—2 of Figure 1.

Figure 4 is a perspective view of one of the parts of my improved device.

Figure 5 is a perspective view of one of the wedge-shaped members employed in carrying out this invention.

Figure 6 is a fragmentary view showing in side elevation a mandrel constructed in accordance with this invention.

Figure 7 is a view in central, longitudinal section taken as indicated by the line 7—7 of Figure 3 and having the central portion of the mandrel broken away.

Proceeding now to a detailed description of the invention with reference to the particular adaptation thereof illustrated in the drawing, the numerals 7 and 8 denote like portions of a two-part mold. Each of the parts 7 and 8 are provided with a plurality of lugs 9 which are arranged thereon with the lugs 9 on one part directly above the corresponding lugs 9 on the other part. Each lug 9 is provided with a vertical bore 10 adapted to receive a bolt 11 which may be employed to secure the two parts 7 and 8 in assembled relation. The mold is provided with a cylindrical cavity 12 which in shape and size corresponds to the desired shape and size of the hose to be constructed therein. The cavity 12 is reduced at each end of the mold to conform substantially to the shape and size of the cavity of the hose to be constructed therein.

Referring now particularly to my improved mandrel, the numerals 13 and 14 denote two arcuate side portions each being of the same size and shape and each corresponding in shape to a longitudinally extending portion of a hollow cylinder adapted to fit within the cavity of an air brake hose or other article to be constructed thereon.

The numeral 15 denotes a collar having a cylindrical cavity 16 adapted to receive the similar ends of the side portions 13 and 14. The portions 13 and 14 are oppositely positioned within said collar and secured therein by means of the bolts 17, which are fitted in suitable threaded bores formed in said collar at diametrically opposite points. Each bolt 17 is provided with a reduced smooth inner end which forms a pin adapted to loosely seat in a suitable bore 18, one of which is formed in each of said sections so as to permit free radial movement of each section 13 and 14.

At the other end of my improved mandrel, a hollow cylindrical ring 19 is positioned between the sections 13 and 14. The ring 19 is provided at diametrically opposite points with radial bores in which is fitted a bolt 22. Each section 13 and 14 is provided with a bore 20 adapted to loosely receive the bolt 22 which extends through the bores in said ring and through bores 20 in said sections. The bolt 22 is provided on each end with a head, nut or other suitable means to loosely retain the sections in assembled relation. Each bore 20 is counterbored as at 21 to allow a limited radial movement of said sections. The sections 13 and 14 are provided with opposing faces 23 which are disposed obliquely to a radius of the mandrel, with the opposing edges 23 converging outwardly to form a longitudinally extending slot adapted to receive the wedge-shaped member 24 hereinafter described. The wedge-shaped members 24 extend longitudinally of the mandrel and each member is provided with an outer face which constitutes a portion of a cylinder and corresponds in contour to the contour of the members 13 and 14, but is preferably formed relatively narrower than the said side portions. Each member 24 is wedge-shaped, being provided with oblique sides 24$^a$ and 24$^b$, which are adapted to contact with the oblique faces 23 of the side members 13 and 14 so that when the members 24 are forced outwardly, flush with the outer faces of the members 13 and 14, a perfect cylindrical form will be provided. Each member 24 is provided on the inner face thereof with a centrally positioned notch 25 which is formed therein for a purpose presently to appear. Each member 24 has a relatively thick central portion and the inner face thereof tapers from the notch 25 so the said member is relatively thinner at each end thereof. Each member is thus provided on the inner face thereof with the flat faces 24$^c$ which extend at an angle to the axis of the mandrel.

The numeral 26 denotes a rod which extends coaxially through the mandrel and is provided centrally thereof with an enlarged cylindrical, central portion 27 which is adapted to seat in the notch 25 to hold the rod 26 from longitudinal movement, relative to the mandrel. The rod 26 is provided adjacent the forward end thereof with right hand screw threads 26$^a$ and is provided adjacent the other end thereof with left hand screw threads 26$^b$.

The wedge-shaped member 28 is mounted on the threaded portions of the rod 26 adjacent each end thereof so as to be positioned between the opposing faces 24$^c$ of the members 24. One of the wedge-shaped members 28 is illustrated in Figure 4 and each wedge member is provided with a longitudinally extending threaded bore. The members 28 are alike except that one is provided with right hand screw threads and the other with left hand screw threads to fit the threaded portions of said rod on which it is mounted. The rod 26 projects from the forward end of the mandrel and is provided with a suitable hand wheel 29 or other convenient means whereby it may be rotated to move the wedge-members 28 toward and from the center thereof.

In use, the hand wheel 29 is operated to contract the mandrel as hereinbefore set forth and the material of which the article is to be formed is wound thereon. In the manufacture of an air brake hose, the mandrel is first covered with a layer of rubber and textile fabric, cord fabric or other suitable hose building material is then wound on the layer of rubber to form a carcass of the desired number of plies. The carcass thus formed is then covered with a layer of rubber and the mandrel with the hose thereon is placed within the cavity of a two-part mold. The parts 7 and 8 of the mold may be secured in operative relation by means of the bolts 11 or by being placed in a press or by any suitable means. The wheel 29 is then operated to move the wedge-members 28 toward the center of the rod 26 thus forcing the members 24 outwardly. As the members 24 are moved outwardly the inclined lateral faces 24$^a$ engage the beveled faces 23 of the members 13 and 14 and spread them laterally apart forming a cylindrical mandrel.

When operated in the manner above described, the hose will be stretched and compacted against the wall of the mold during vulcanization and the product thus formed will be strong and durable and capable of withstanding great pressure.

If desired, the mandrel may be expanded and the article thus formed may be vulcanized without being placed in a mold or the article may be wound with cloth or otherwise restrained during vulcanization.

Having thus illustrated my invention and described the same in detail what I claim as new and desire to secure by Letters-Patent is:—

1. In a mandrel of the class described, like side members each corresponding to a longitudinally extending portion of a cylinder, said side members being oppositely positioned with the opposing edges thereof in parallel spaced relation, a cylindrical collar, the similar ends of said side members being positioned in said collar and being loosely retained therein, means to loosely retain the opposite ends of said members in assembled relation, wedge members positioned between the opposing edges of said side members, said wedge members comprising longitudinally extending portions of the same cylinder, and means to simultaneously move said wedge members radially of the mandrel.

2. In a mandrel of the class described, like side members each corresponding to a longitudinally extending portion of a cylinder, said side members being oppositely positioned with the opposing edges thereof in parallel spaced relation, a cylindrical collar, the similar ends of said side members being positioned in said collar and being loosely retained therein, means to loosely retain the opposite ends of said members in assembled relation, wedge members positioned between the opposing edges of said side members said wedge members comprising longitudinally extending portions of the same cylinder, said wedge members being provided on the inner faces thereof with surfaces inclined to the axis of the mandrel, wedges mounted between said inclined faces, each wedge provided with a threaded bore, a threaded rod projecting forwardly from said collar and extending co-axially through said mandrel, said wedges operatively mounted on said rod and adapted to be moved axially thereon by a rotary movement thereof.

3. In a device of the class described in combination, a two part mold, and a mandrel positioned therein, said mandrel comprising like side members, each corresponding to a longitudinally extending portion of a cylinder, a cylindrical collar positioned outside of said mold, said side members being oppositely positioned with the similar ends thereof received in said collar, means to secure said members to said collar so the same may be moved radially thereof, wedge members positioned between said side members a rod extending coaxially through said mandrel and projecting forwardly from said collar, a hand wheel on the outer projecting end of said rod and means mounted on said rod whereby a rotary movement thereof will force said wedge members apart and expand the mandrel.

In testimony whereof I have hereunto set my hand.

WILLIAM S. DOLL.